United States Patent
Wang et al.

(10) Patent No.: US 9,841,432 B2
(45) Date of Patent: *Dec. 12, 2017

(54) INERTIA MEASUREMENT MODULE FOR UNMANNED AIRCRAFT

(71) Applicant: SZ DJI TECHNOLOGY CO., LTD, Shenzhen (CN)

(72) Inventors: Tao Wang, Shenzhen (CN); Tao Zhao, Shenzhen (CN)

(73) Assignee: SZ DJI TECHNOLOGY CO., LTD, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/231,674

(22) Filed: Aug. 8, 2016

(65) Prior Publication Data

US 2016/0349280 A1    Dec. 1, 2016

Related U.S. Application Data

(63) Continuation of application No. 14/241,891, filed as application No. PCT/CN2011/079705 on Sep. 15, 2011.

(30) Foreign Application Priority Data

Sep. 2, 2011   (CN) .......................... 2011 1 0260585

(51) Int. Cl.
*G01P 1/02*    (2006.01)
*G01P 15/08*   (2006.01)
(Continued)

(52) U.S. Cl.
CPC .............. *G01P 1/003* (2013.01); *B64D 45/00* (2013.01); *F16F 15/00* (2013.01); *G01C 19/16* (2013.01);
(Continued)

(58) Field of Classification Search
CPC ........ G01P 15/14; G01P 15/15; G01P 15/097; G01P 1/02; G01P 1/023; G01P 1/003;
(Continued)

(56) References Cited

U.S. PATENT DOCUMENTS 5,115,291 A     5/1992  Stokes
5,239,866 A *   8/1993  Froidevaux .......... G01D 11/245
                                                  73/430

(Continued)

FOREIGN PATENT DOCUMENTS

CN          1821717 A      8/2006
CN        101349564 A      1/2009
(Continued)

OTHER PUBLICATIONS

Chinese office action dated Mar. 3, 2016 CN Application No. 201110260585.

(Continued)

*Primary Examiner* — Helen Kwok
(74) *Attorney, Agent, or Firm* — Wilson Sonsini Goodrich & Rosati

(57) ABSTRACT

The present disclosure relates to an inertia measurement module for an unmanned aircraft, which comprises a housing assembly, a sensing assembly and a vibration damper. The vibration damper comprises a first vibration-attenuation cushion; and the sensing assembly comprises a first circuit board, a second circuit board and a flexible signal line for connecting the first circuit board and the second circuit board. An inertia sensor is fixed on the second circuit board, and the first circuit board is fixed on the housing assembly. The inertia measurement module further comprises a weight block, and the second circuit board, the weight block, the first vibration-attenuation cushion and the first circuit board are bonded together. The present disclosure greatly reduces (Continued)

the influence of the operational vibration frequency of the unmanned aircraft on the inertia sensor and improves the measurement stability of the inertia sensor.

30 Claims, 5 Drawing Sheets

(51) Int. Cl.
| | |
|---|---|
| G01C 19/56 | (2012.01) |
| G01P 1/00 | (2006.01) |
| F16F 15/00 | (2006.01) |
| G01C 21/16 | (2006.01) |
| B64D 45/00 | (2006.01) |
| G01C 25/00 | (2006.01) |
| G01C 19/16 | (2006.01) |
| G01C 19/5628 | (2012.01) |
| G01C 19/5663 | (2012.01) |
| G01C 19/5769 | (2012.01) |
| G01C 19/5783 | (2012.01) |

(52) U.S. Cl.
CPC ......... *G01C 19/56* (2013.01); *G01C 19/5628* (2013.01); *G01C 19/5663* (2013.01); *G01C 19/5769* (2013.01); *G01C 19/5783* (2013.01); *G01C 21/16* (2013.01); *G01C 25/00* (2013.01); *G01P 1/023* (2013.01); *G01P 15/08* (2013.01); *G01P 15/0802* (2013.01); *B64C 2201/14* (2013.01)

(58) Field of Classification Search
CPC . G01P 15/0802; G01C 19/56; G01C 19/5783; G01C 19/5719; G01C 19/5769; G01C 19/5607; G01C 19/5628
USPC ................................ 73/493, 504.04, 504.12
See application file for complete search history.

(56) References Cited

U.S. PATENT DOCUMENTS

| | | | |
|---|---|---|---|
| 5,546,644 A | 8/1996 | Kakizaki et al. | |
| 5,644,081 A * | 7/1997 | Schwarz | G01P 1/023 73/493 |
| 5,668,316 A | 9/1997 | Iwai et al. | |
| 6,145,380 A * | 11/2000 | MacGugan | G01P 15/097 73/493 |
| 6,578,682 B2 * | 6/2003 | Braman | G01C 21/16 188/378 |
| 6,880,399 B1 * | 4/2005 | Okoshi | G01C 19/5628 73/493 |
| 7,603,903 B2 | 10/2009 | Ohta | |
| 7,891,244 B2 * | 2/2011 | Ohta | B81B 7/0058 73/493 |
| 7,938,004 B1 | 5/2011 | Brunsch, Jr. et al. | |
| 7,939,004 B2 | 5/2011 | Hirayama et al. | |
| 8,826,734 B2 | 9/2014 | Ohkoshi et al. | |
| 2002/0065626 A1 | 5/2002 | McCall et al. | |
| 2004/0045520 A1 * | 3/2004 | Slopsema | F02B 75/06 123/192.2 |
| 2007/0074570 A1 * | 4/2007 | Braman | F16F 15/08 73/504.14 |
| 2007/0113702 A1 | 5/2007 | Braman et al. | |
| 2009/0308157 A1 | 12/2009 | Eriksen et al. | |
| 2010/0037694 A1 | 2/2010 | Grossman | |
| 2010/0257932 A1 * | 10/2010 | Braman | G01C 21/16 73/493 |
| 2013/0111993 A1 | 5/2013 | Wang | |
| 2014/0224014 A1 * | 8/2014 | Wang | F16F 15/00 73/504.04 |
| 2017/0059319 A1 | 3/2017 | Feng et al. | |

FOREIGN PATENT DOCUMENTS

| | | |
|---|---|---|
| CN | 101750065 A | 6/2010 |
| CN | 101922938 A | 12/2010 |
| CN | 202274882 U | 6/2012 |
| CN | 102778232 A | 11/2012 |
| CN | 102980584 A | 3/2013 |
| CN | 103210280 A | 7/2013 |
| CN | 203037259 U | 7/2013 |
| CN | 203249935 U | 10/2013 |
| EP | 1788277 A2 | 5/2007 |
| JP | H04297837 A | 10/1992 |
| JP | 2002022761 A | 1/2002 |
| JP | 2007-093329 A | 4/2007 |
| JP | 2007163471 A | 6/2007 |
| JP | 2009053005 A | 3/2009 |
| WO | WO 03/029756 A1 | 4/2003 |
| WO | WO-2011140804 A1 | 11/2011 |

OTHER PUBLICATIONS

European office action dated Jun. 10, 2015 for EP Application No. 11871565.5.
European search report dated Mar. 26, 2015 for EP Application No. 11871565.5.
International search report and written opinion dated Dec. 22, 2011 for PCT/CN2011/079705.
Japanese office action dated Jan. 22, 2015 for JP Application 2014-527461.
Office action dated Feb. 11, 2016 for U.S. Appl. No. 14/241,891.
Office action dated Jun. 28, 2016 for U.S. Appl. No. 14/241,891.
Office action dated Sep. 27, 2016 for U.S. Appl. No. 14/241,891.
"International search report with written opinion dated Jan. 20, 2016 for PCT/CN2015/076012".
"Office action dated Jan. 23, 2017 for U.S. Appl. No. 15/349,980".
Co-pending U.S. Appl. No. 15/349,980.
Office action dated Mar. 1, 2017 for U.S. Appl. No. 14/241,891.
Dayou. Noise and Vibration Control Engineering Handbook. China Machine Press, 2002. pp. 577-579.
Harris, et al. Shock and Vibration Handbook. Science Press, Dec. 1990. pp. 2, 19, 606, 610, and 611.
Zhu, et al. College Physics. Textbook Series in Physics for Higher Education. Tsinghua University Press, 2004. p. 211-223.
Notice of allowance dated Aug. 8, 2017 for U.S. Appl. No. 14/241,891.
Office action dated Jun. 16, 2017 for U.S. Appl. No. 15/349,980.
Office action dated Jun. 21, 2017 for U.S. Appl. No. 14/241,891.

* cited by examiner

INERTIA MEASUREMENT MODULE FOR UNMANNED AIRCRAFT

FIELD

The present disclosure generally relates to the technical field of unmanned aircraft control, and more particularly, to an inertia measurement module for an unmanned aircraft.

BACKGROUND

In the conventional technology, for buffering of an inertia measurement module of an unmanned aircraft, four vibration-attenuation cushions are disposed outside a housing of a control module thereof to form four fulcrums that support the housing of the whole control module. The structure of disposing the vibration-attenuation cushions outside the inertia measurement module for the unmanned aircraft has following drawbacks: (1) the vibration-attenuation cushions need be stalled on a platform, so that both the volume and weight of the whole control module are increased, which increases the invalid load of the aircraft and makes it inconvenient to be installed; (2) because the vibration-attenuation cushions are exposed outside, there is a probability that the vibration-attenuation cushions might be damaged, and this has an influence on the service life of the inertia measurement module for the unmanned aircraft; and (3) the buffering effect might be compromised by the main control connections.

SUMMARY

The technical problem to be solved by the present disclosure is that, in view of the problem that disposing the vibration-attenuation cushions outside leads to a bulky volume and a poor buffering effect of the conventional inertia measurement module for the unmanned aircraft, an inertia measurement module for an unmanned aircraft is provided to solve this problem. A technical solution of the present disclosure to solve this technical problem is: providing an inertia measurement module for an unmanned aircraft, which comprises a housing assembly, a sensing assembly and a vibration damper. The sensing assembly and the vibration damper are disposed in the housing assembly. The vibration damper comprises a first vibration-attenuation cushion for buffering vibrations; the sensing assembly comprises a first circuit board, a second circuit board and a flexible signal line for communicationally connecting the first circuit board and the second circuit board. An inertia sensor is fixedly disposed on the second circuit board, and the first circuit board is fixed on the housing assembly. The inertia measurement module further comprises a weight block for increasing weight, and the second circuit board, the weight block, the first vibration-attenuation cushion and the first circuit board are bonded together in sequence into one piece and then fitted into the housing assembly.

Furthermore, in the inertia measurement module for the unmanned aircraft of the present disclosure, the vibration damper further comprises a second vibration-attenuation cushion, which is fixedly bonded on the second circuit board and abuts against an inner wall of the housing assembly.

Preferably, in the inertia measurement module for the unmanned aircraft of the present disclosure, a bonding area $S_2$ between the second vibration-attenuation cushion and the second circuit board is in a range of 12.6 to 50.2 $mm^2$.

Preferably, in the inertia measurement module for the unmanned aircraft of the present disclosure, the weight block has a weight of 1 g to 30 g.

Preferably, in the inertia measurement module for the unmanned aircraft of the present disclosure, a bonding area $S_1$ between the first vibration-attenuation cushion and the second circuit board is in a range of 12.6 to 50.2 $mm^2$.

Specifically, in the inertia measurement module for the unmanned aircraft of the present disclosure, the housing assembly comprises a first housing and a second housing mating with and locked to each other.

Specifically, in the inertia measurement module for the unmanned aircraft of the present disclosure, the second circuit board is fixedly disposed on a supporting sheet, and the supporting sheet is fixedly bonded to the weight block.

Preferably, in the inertia measurement module for the unmanned aircraft of the present disclosure, the inertia sensor comprises a gyroscope for detecting an angular speed signal and an accelerometer for detecting an acceleration signal, the angular speed signal and the acceleration signal are transmitted to the first circuit board via the flexible signal line.

Specifically, in the inertia measurement module for the unmanned aircraft of the present disclosure, a power source, a memory, a processor and a circuit module are fixedly disposed on the first circuit board.

Specifically, in the inertia measurement module for the unmanned aircraft of the present disclosure, the sensing assembly further comprises a signal input interface terminal and a signal output interface terminal, the signal input interface terminal and the signal output interface terminal are connected to the first circuit board through interface signals; and the housing assembly forms an inner chamber that opens at two ends, and the signal input interface terminal and the signal output interface terminal are disposed in the inner chamber and snap-fitted to the two ends of the inner chamber.

The present disclosure has following advantages: components including the inertia sensor and so on that require a high vibration performance, are integrated on the second circuit board, and the vibration damper is disposed to improve the vibration characteristics of the inertia measurement module so that the inherent mechanical vibration frequency of the inertia measurement module is much lower than various vibration frequencies unrelated to movement that are generated by the aircraft. By disposing the first vibration-attenuation cushion, vibrations caused by the unmanned aircraft to the inertia sensor are attenuated quickly, and when frequencies of above 50 Hz are generated by the aircraft, the vibrations suffered by the inertia sensor after the vibration-attenuation cushion is disposed, are attenuated to below 30% of those suffered before the vibration-attenuation cushion is disposed. This greatly reduces the influence of the operational vibration frequency of the unmanned aircraft on the inertia sensor and improves the measurement stability of the inertia sensor; and this also remarkably reduces the volume and weight of the inertia measurement module and enlarges the loading space of the unmanned aircraft.

BRIEF DESCRIPTION OF THE DRAWINGS

Hereinbelow, the present disclosure will be further described with reference to the attached drawings and the embodiments thereof, in which.

DETAILED DESCRIPTION

In order to provide a clearer understanding of the technical features, objects and effects of the present disclosure, embodiments of the present disclosure will be detailed with reference to the attached drawings hereinbelow.

Violent random vibrations are the primary mechanics factor to which a strapdown inertial navigation module is exposed in operation. The vibrations lead to instability in performance of the inertia measurement module or damage of electronic components, and have a great influence on the stability of the inertia measurement module. In order to reduce the damage of components on the circuit board or the instability of the inertia sensor due to violent random vibrations of the unmanned aircraft, the influence of vibrations of the unmanned aircraft on the inertia sensor may be reduced by, on one hand, altering the connecting structures between parts within the housing assembly to enhance the connection rigidity between the parts and, on the other hand, using a vibration damper as a damping medium to elastically connect the inertia measurement module to the unmanned aircraft. The choice of the buffering mode has an influence not only on the buffering performance of the inertial navigation system but also on the measurement accuracy of the system. Accordingly, the present disclosure seeks to improve performances of the miniature inertia measurement module by improving the vibration damper and rationalizing the buffering mechanic structure.

Figure 1:
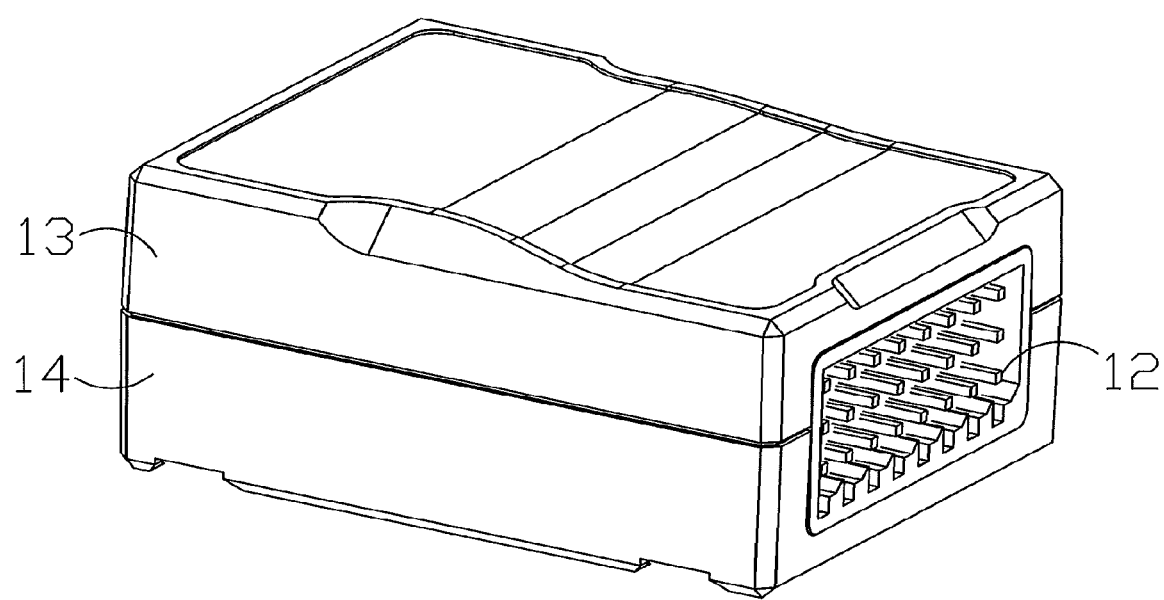
FIG. 1 is a schematic structural view of an inertia measurement module for an unmanned aircraft according to an embodiment of the present disclosure in an assembled state.
Figure 2:
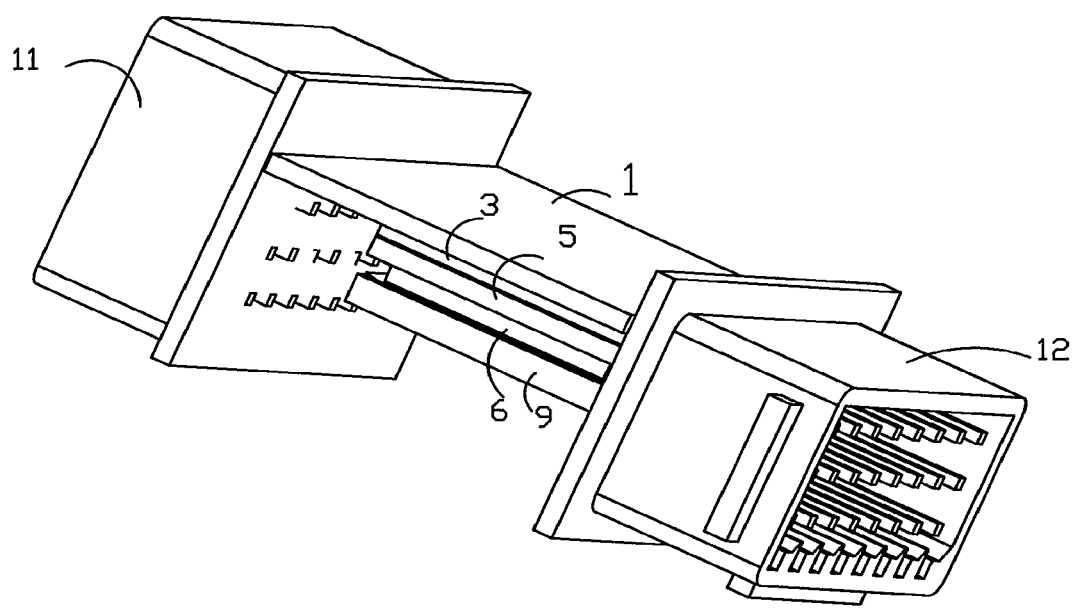
FIG. 2 is a first schematic structural view of the inertia measurement module for an unmanned aircraft according to an embodiment of the present disclosure when a housing assembly is removed.
Figure 3:
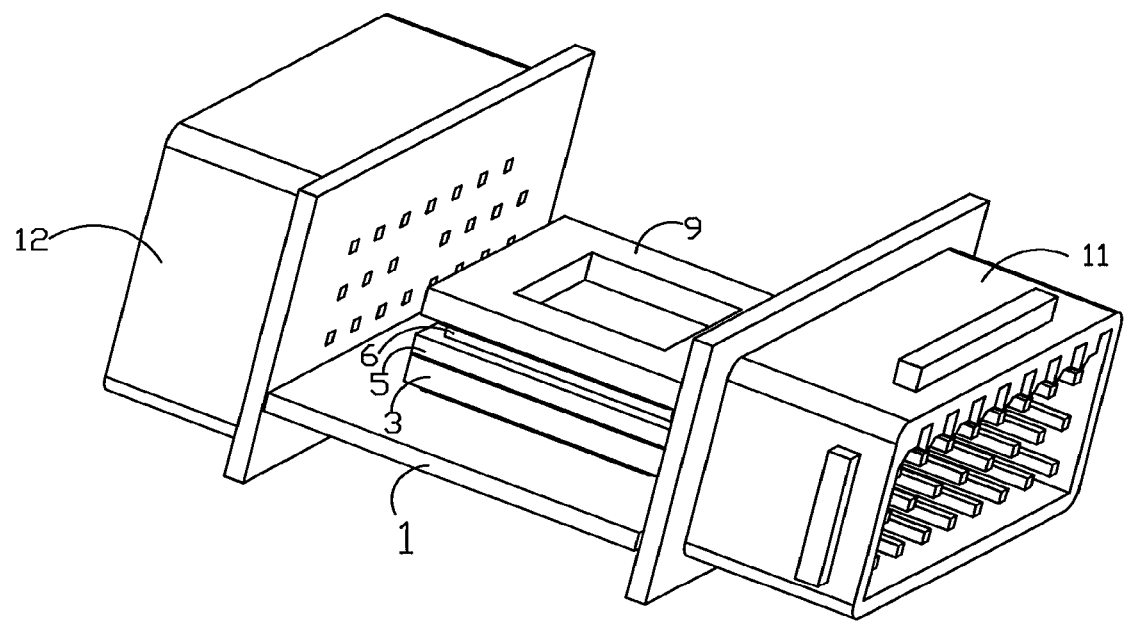
FIG. 3 is a second schematic structural view of the inertia measurement module for an unmanned aircraft according to an embodiment of the present disclosure when the housing assembly is removed.
Figure 4:
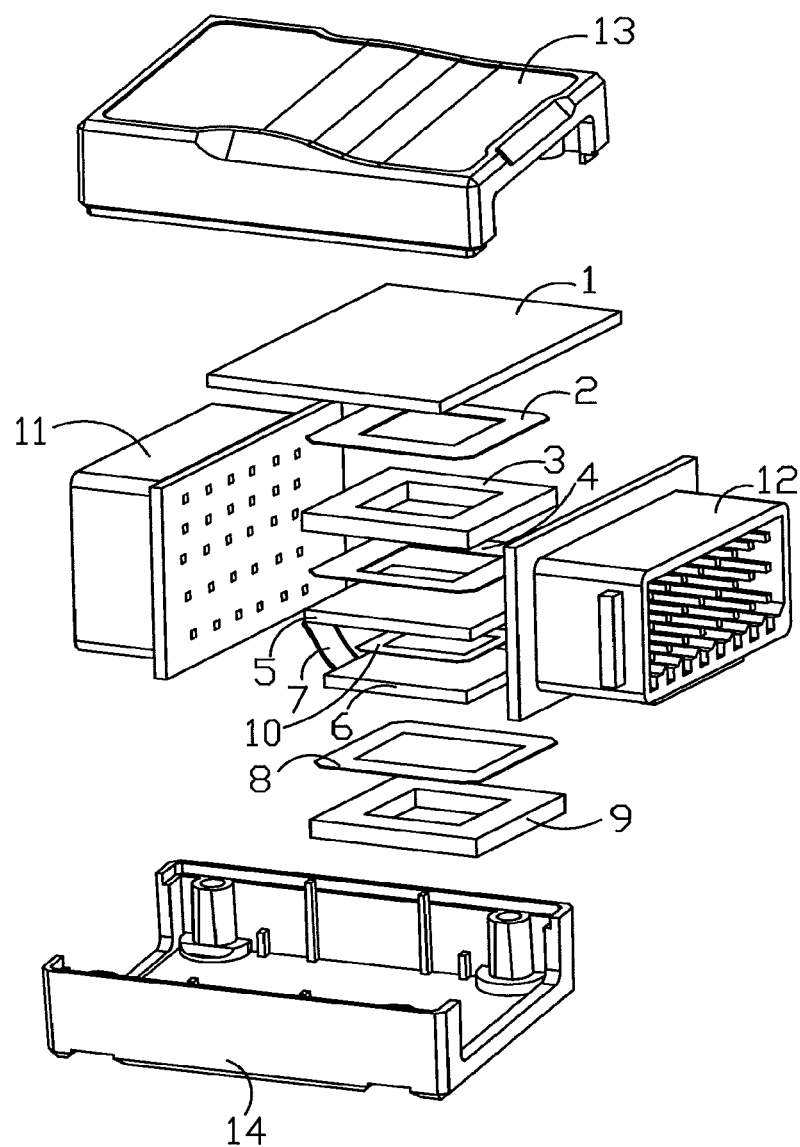
FIG. 4 is a first schematic exploded structural view of the inertia measurement module for an unmanned aircraft according to an embodiment of the present disclosure.
Figure 5:
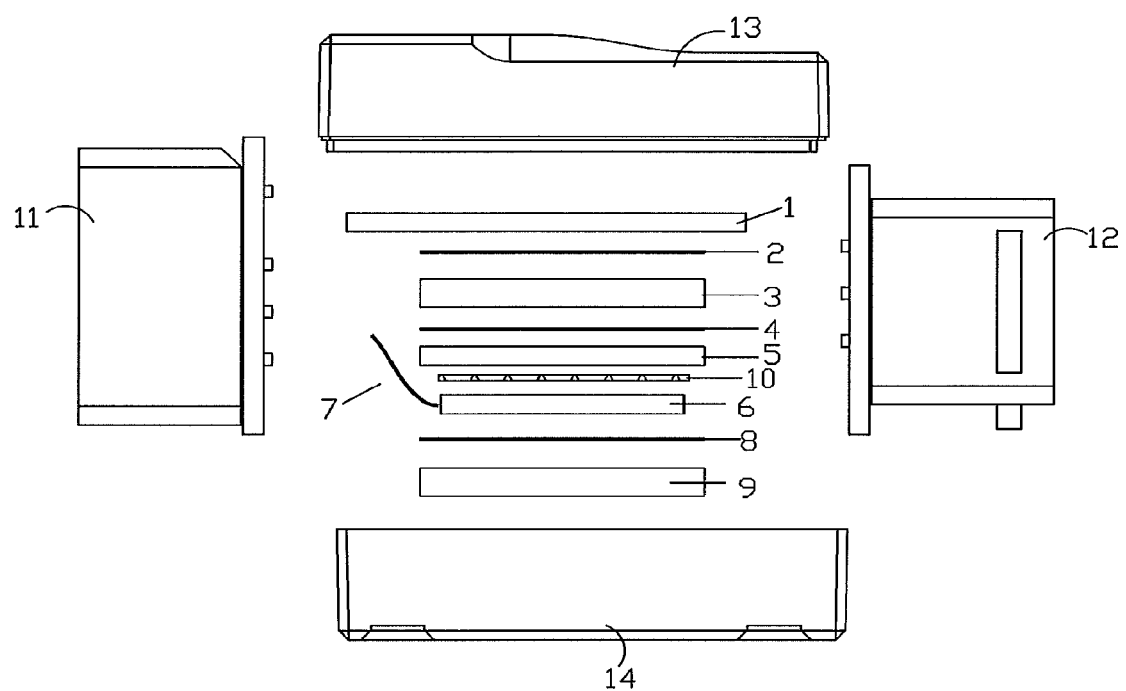
FIG. 5 is a second schematic exploded structural view of the inertia measurement module for an unmanned aircraft according to an embodiment of the present disclosure.

As shown in FIG. 1, FIG. 2 and FIG. 3, an inertia measurement module for an unmanned aircraft according to an embodiment of the present disclosure is shown therein. The inertia measurement module for an unmanned aircraft comprises a housing assembly, a sensing assembly and a vibration damper. As shown in FIG. 1, FIG. 4 and FIG. 5, the housing assembly forms an inner chamber that opens at two ends, and the sensing assembly and the vibration damper are disposed within the inner chamber. As shown in FIG. 4 and FIG. 5, the sensing assembly comprises a first circuit board 1, a second circuit board 6 and a flexible signal line 7 for connecting the first circuit board 1 and the second circuit board 6. The flexible signal line 7 is adapted to transmit various signals detected by sensors on the second circuit board 6 to the first circuit board 1. Components including an inertia sensor and a power source are fixedly disposed on the second circuit board 6. The components that require high vibration performances such as the inertia sensor etc. are integrated into the second circuit board 6, to perform to buffer the inertia sensor by buffering the second circuit board 6, so as to improve the measurement stability of the inertia sensor. To facilitate buffering the second circuit board 6, preferably, the second circuit board 6 is a flexible circuit board. In order to protect the inertia sensor and reduce the influence of vibrations of the unmanned aircraft to the inertia sensor, the vibration damper comprises a first vibration-attenuation cushion 3 for buffering the vibrations as shown in FIG. 4 and FIG. 5. As the first vibration-attenuation cushion 3 is used for buffering the sensing assembly, the size, the density and the material of the first vibration-attenuation cushion 3 and the bonding area between the first vibration-attenuation cushion 3 and the sensing assembly have a great influence on the buffering performances. Preferably, the first circuit board 1 is fixed on the housing assembly by snap-fitting, screwing, riveting, soldering or adhesion. In the inertia measurement module, the inherent frequency thereof is $$f_n = \frac{1}{2\pi}\sqrt{\frac{K}{M}},$$

where K represents the elastic coefficient, and M represents the mass. It can be seen, the greater the mass M is, thus the smaller the inherent frequency $f_n$ will be. To keep the inherent frequency away from the operation frequency of the unmanned aircraft, that is 50 Hz~200 Hz, the inherent frequency $f_n$ shall be as small as possible and, as can be derived from the above formula, this requires increasing the mass M or decreasing the elastic coefficient K. The elastic coefficient K is affected by the material of the vibration damper and the bonding area thereof, and when the elastic coefficient K is a constant value, the inherent frequency $f_n$ shall be decreased by increasing the mass M. In order to increase the mass M, a weight block 5 for increasing the mass is further included in this embodiment, as shown in FIG. 4 and FIG. 5. The weight block 5 serves to, on one hand, decrease the inherent frequency of the inertia measurement module and, on the other hand, provide a support for positioning the second circuit board 6 so that the parts are connected firmly. As shown in FIG. 4 and FIG. 5, the second circuit board 6 is fixedly bonded to a side surface of the weight block 5, the opposite side surface of the weight block 5 is fixedly bonded to the first vibration-attenuation cushion 3 through an adhesive layer 4, the first vibration-attenuation cushion 3 is bonded to the first circuit board 1 through an adhesive layer 2, and the first circuit board 1 is snap-fitted into the housing assembly. That is, the second circuit board 6, the weight block 5, the first vibration-attenuation cushion 3 and the first circuit board 1 are bonded together in sequence into one piece and then snap-fitted into the housing assembly.

Specifically, as an embodiment of the present disclosure, the vibration damper is made of a special buffering material which has an excellent elastic performance. This can provide the following advantages: by disposing the vibration damper, the vibrations caused by the unmanned aircraft to the inertia sensor can be attenuated quickly, and when frequencies of above 50 Hz are generated by the unmanned aircraft, the vibrations suffered by the inertia sensor after the vibration damper is disposed are attenuated to below 30% of those suffered before the vibration damper is disposed. This greatly reduces the influence of the operational vibration frequency of the unmanned aircraft on the inertia sensor and improves the measurement stability of the inertia sensor.

In order to further provide buffering for the inertia sensor on the basis of the above technical solution so that buffering can be achieved at both the two opposite sides of the second circuit board 6, the vibration damper further comprises a second vibration-attenuation cushion 9 as shown in FIG. 4 and FIG. 5. The second vibration-attenuation cushion 9 is fixedly bonded to the second circuit board 6 and abuts against an inner wall of the housing assembly. The second vibration-attenuation cushion 9 and the first vibration-attenuation cushion 3 are located at two sides of the second circuit board 6 respectively so that forced vibrations caused by the unmanned aircraft from different directions can be absorbed in a balanced way by the two vibration-attenuation cushions. Thus, when the unmanned aircraft flips over, makes a turn, ascends or descends in the air, the inertia sensor on the second circuit hoard 6 can be well protected with a better buffering effect.

Further, as shown in FIG. 4, the second vibration-attenuation cushion 9 is in the form of a hollow cuboid, which has a length of 13 mm~20 mm, a width of 13 mm~20 mm and a thickness of 3 mm~4 mm. It can be appreciated that, the hollow part of the second vibration-attenuation cushion 9 is not limited to be the cuboidal form shown in FIG. 4, but may also be a circular form, an ellipsoidal form, a rhombus form, a quincuncial form or some other regular form. Preferably, the hollow part is in the "◡" form, which is favorable for improving the elasticity of the second vibration-attenuation cushion 9 to enhance the buffering effect. It shall be noted that, the form of the second vibration-attenuation cushion 9 is not limited to the cuboidal form either, but may also be some other regular or irregular form. Preferably, the second vibration-attenuation cushion 9 is in a sheet form for ease of installation.

A multitude of tiny cavities are distributed in the elastic material, and the size and quantity of the cavities have an influence on the performance of the elastic material. The second vibration-attenuation cushion 9 is fixedly bonded to the second circuit board 6 through an adhesive layer 8, and in order to ensure secure bonding, theoretically the bonding area $S_2$ of the adhesive layer 8 shall be as large as possible. However, if the bonding area $S_2$ is too large, the cavities in the elastic material would be blocked by the adhesive layer, and in case the cavities were blocked in a large area in the elastic material, the elasticity of the elastic material would be significantly compromised (i.e., the elastic coefficient K would be increased) to lead to a correspondingly increased $$f_n = \frac{1}{2\pi}\sqrt{\frac{K}{M}}.$$

Therefore, the area of the adhesive layer 8 shall be set to an appropriate size, and the bonding area $S_2$ between the second vibration-attenuation cushion 9 and the second circuit board 6 is preferably in a range of 12.6 to 50.2 mm² and, more preferably, is 28.3 mm².

The inherent frequency is $$f_n = \frac{1}{2\pi}\sqrt{\frac{K}{M}},$$

so in order to reduce the inherent frequency as far as possible on the basis of the above technical solution, the weight of the weight block is 1 g~30 g and, preferably, is 15 g, 17.5 g, 20 g or 25 g.

Further, the weight block 5 is made of a metal material having a relatively large density, and is in the form of a cuboid that can save use of space. The cuboid has a length of 13 mm~15 mm, a width of 13 mm~15 mm and a thickness of 3 mm~5 mm. Preferably, the weight block 5 has a length of 15 mm, a width of 15 mm and a height of 4 mm to ensure a good stability. It shall be noted that, the form of the weight block 5 is not limited to the cuboidal form, but may also be some other regular or irregular form. Preferably, the weight block 5 is in a sheet form or a lump form to facilitate tight connection with the second circuit board 6.

In order to reduce the volume of the inertia measurement module and decrease the height of the measurement module on the basis of the above technical solution, preferably a recess that matches in shape with the second circuit board 6 is formed on the weight block 5. The second circuit board 6 is embedded into the recess and fixed with the weight block 5 through adhesion. Embedding the second circuit board 6 into the recess of the weight block 5 can, on one hand, save use of the space and, on the other hand, facilitate quick and uniform dissipation of heat from the second circuit board 6 because of its close attachment to the metallic weight block 5. This can effectively avoid overheating in local regions of the second circuit board 6 to prolong the service life of components of the second circuit board 6.

Similarly, as shown in FIG. 4, the first vibration-attenuation cushion 3 is in the same form as the second vibration-attenuation cushion 9. Specifically, the first vibration-attenuation cushion 3 is in the form of a hollow cuboid, which has a length of 13 mm~20 mm, a width of 13 mm~20 mm and a thickness of 3 mm~4 mm. It can be appreciated that, the hollow part of the first vibration-attenuation cushion 3 is not limited to be the cuboidal form shown in FIG. 4, but may also be a circular form, an ellipsoidal form, a rhombus form, a quincuncial form or some other regular form. Preferably, the hollow part is of a "◡" form, which is favorable for improving the elasticity of the first vibration-attenuation cushion 3 to enhance the buffering effect. Similarly, the shape of the first vibration-attenuation cushion 3 is not limited to the cuboidal form either, but may also be some other regular or irregular form. Preferably, the first vibration-attenuation cushion 3 is in a sheet form to facilitate close attachment to the weight block 5. Further, a multitude of tiny cellular cavities are distributed in the elastic material, and the size and quantity of the cavities have an influence on the performance of the elastic material. The first vibration-attenuation cushion 3 is fixedly bonded to the first circuit board 1 through an adhesive layer 2, and in order to ensure secure bonding, theoretically the bonding area $S_1$ of the adhesive layer 2 shall be as large as possible. However, if the bonding area $S_1$ is too large, the cavities in the elastic material would be blocked by the adhesive layer 2, and in case the cavities were blocked in a large area in the elastic material, the elasticity of the elastic material would be significantly compromised (i.e., the elastic coefficient K would be increased) to lead to a correspondingly increased $$f_n = \frac{1}{2\pi}\sqrt{\frac{K}{M}}.$$

Therefore, the area of the adhesive layer 2 shall be set to an appropriate size, and the bonding area $S_1$ between the first vibration-attenuation cushion 3 and the first circuit board 1 is preferably in a range of 12.6 to 50.2 mm² and, more preferably, is 28.3 mm².

Referring to FIG. 1, FIG. 4 and FIG. 5, as a preferred embodiment of the present disclosure on the basis of the above technical solution, the housing assembly comprises a first housing 13 and a second housing 14 mating with and locked to each other, and the first housing 13 and the second housing 14 are snap-fitted with each other to form an inner chamber. Such a structure is favorable for assembly and detachment, and allows for maintaining parts inside the housing assembly timely.

Preferably, the first housing 13 and the second housing 14 are locked to each other by screws. It shall be appreciated that, the first housing 13 and the second housing 14 may also be locked to each other through riveting, snap-fitting or plugging.

On the basis of the above technical solution, the flexible second circuit board 6 is preferably fixed on a supporting sheet as shown in FIG. 5. The supporting sheet is fixedly bonded to the weight block through an adhesive layer 10, and serves to facilitate tight bonding between the second circuit board 6 and the weight block 5.

On the basis of the above technical solution, the adhesive layer 10, the adhesive layer 2, the adhesive layer 8 and the adhesive layer 4 are made of a special material that has good adhesiveness, good resistance to repel and good workability. This kind of adhesive layers may be controlled to be within 0.15 mm in thickness and to provide an adhesive force of 14~17N/20 mm. It can be appreciated that, the aforesaid adhesive layers may be in sheet form (i.e., surface bonding) or be formed by a plurality of individual portions (i.e., multi-point bonding).

Specifically, a power source, a memory, a processor and a circuit module are fixedly disposed on the first circuit board 1. The inertia sensor comprises a gyroscope for detecting an angular speed signal and an accelerometer for detecting an acceleration signal. The angular speed signal and the acceleration signal are transmitted to the first circuit board 1 via the flexible signal line 7, and are then processed in the memory and the processor for output to control the steering engine of the unmanned aircraft.

Further, as shown in FIG. 1, FIG. 2 and FIG. 3, the sensing assembly further comprises a signal input interface terminal 11 and a signal output interface terminal 12 which are connected to the first circuit board 1 via interface signals. In this embodiment, both the signal input interface terminal 11 and the signal output interface terminal 12 are connected to the first circuit board 1 preferably in an asynchronous serial manner. As shown in FIG. 1, the housing assembly forms an inner chamber that opens at two ends, and the signal interface terminal 11 and the signal output interface terminal 12 are disposed within the inner chamber and snap-fitted to the two ends of the inner chamber. Such a structure is compact and occupies a small space.

Embodiments of the present disclosure have been described above with reference to the attached drawings. However, the present disclosure is not limited to the aforesaid embodiments, and the aforesaid embodiments are provided only for illustration but not for limitation. In light of the present disclosure, those of ordinary skill in the art can make numerous modifications without departing from the spirit of the present disclosure and the scope claimed in the claims, and all these modifications shall fall within the scope of the present disclosure.

What is claimed is:

1. An inertia measurement module for an unmanned aircraft, the inertia measurement module comprising:
   a second circuit board with an inertia sensor;
   a first circuit board with a processor to process one or more signals from the inertia sensor;
   a signal line between the first circuit board and the second circuit board;
   a weight block comprising a recess, wherein the second circuit board is embedded in the recess of the weight block, and wherein the weight block comprising the recess is of a mass such that an inherent frequency of the inertia measurement module is reduced to be less than an operation frequency of the unmanned aircraft; and
   a vibration damper provided to attenuate vibration of the inertia sensor.

2. The inertia measurement module of claim 1, wherein the vibration damper comprises a cushion between the weight block and the first circuit board.

3. The inertia measurement module of claim 1, wherein the vibration damper comprises a cushion between the second circuit board and a housing assembly of the unmanned aircraft on which the inertia measurement module is mounted.

4. The inertia measurement module of claim 1, wherein the weight block is made of a metal material.

5. The inertia measurement module of claim 1, wherein the weight block is a cuboidal metal block.

6. The inertia measurement module of claim 1, wherein the weight block has a weight of 1 gram to 30 grams.

7. The inertia measurement module of claim 1, wherein the second circuit board is disposed on a supporting sheet, which is bonded to the weight block.

8. The inertia measurement module of claim 1, further comprising an adhesive layer, which bonds the second circuit board with the weight block.

9. The inertia measurement module of claim 1, wherein the inertia sensor comprises a gyroscope, which senses an angular speed, and an accelerometer, which senses acceleration.

10. The inertia measurement module of claim 1, wherein the first circuit board comprises a memory, and a circuit module.

11. The inertia measurement module of claim 1, further comprising a signal input interface terminal and a signal output interface terminal connected to the first circuit board.

12. The inertia measurement module of claim 11, wherein the signal input interface terminal or the signal output interface terminal communicates with the first circuit board in an asynchronous serial manner.

13. The inertia measurement module of claim 1, wherein the recess of the weight block has a shape and dimensions substantially matching a shape and dimensions of the second circuit board.

14. The inertia measurement module of claim 1, wherein the vibration damper includes portions arranged on opposite sides of the weight block and the second circuit board.

15. The inertia measurement module of claim 1, wherein the second circuit board is a flexible circuit board.

16. The inertia measurement module of claim 3, wherein the cushion has a width of 13 mm to 20 mm.

17. The inertia measurement module of claim 3, wherein the cushion has a thickness of 3 mm to 4 mm.

18. The inertia measurement module of claim 1, wherein the signal line is a flexible signal line.

19. The inertia measurement module of claim 1, wherein the inherent frequency of the inertia measurement module is configured to be outside of an operation frequency range of the unmanned aircraft.

20. The inertia measurement module of claim 1, wherein the inherent frequency of the inertia measurement module is configured to be less than 50 hertz.

21. The inertia measurement module of claim 1, wherein the second circuit board, the weight block, and the first circuit board are bonded together in one piece.

22. The inertia measurement module of claim 1, wherein the vibration damper has an elastic coefficient that reduces the inherent frequency of the inertia measurement module to be less than the operation frequency of the unmanned aircraft.

23. The inertia measurement module of claim 6, wherein the weight block has a weight of 15 grams to 25 grams.

24. The inertia measurement module of claim 3, wherein the cushion abuts against an inner wall of a housing assembly, said housing assembly being configured to support the inertia measurement module.

25. The inertia measurement module of claim 19, wherein the operation frequency range of the unmanned aircraft ranges from 50 hertz to 200 hertz.

26. The inertia measurement module of claim 1, wherein the first circuit board is located further away from the weight block compared to the second circuit board.

27. The inertia measurement module of claim 24, wherein the inertia measurement module is rigidly affixed to the housing assembly.

28. The inertia measurement module of claim 1, wherein the recess is formed on only one side of the weight block.

29. The inertia measurement module of claim 1, wherein the recess does not form a through-hole extending through the weight block.

30. The inertia measurement module of claim 1, wherein the recess has an inner side surface extending along a perimeter of said recess, and wherein a side lateral surface of the second circuit board is in contact with the inner side surface of the recess when the second circuit board is embedded in said recess.

* * * * *